UNITED STATES PATENT OFFICE.

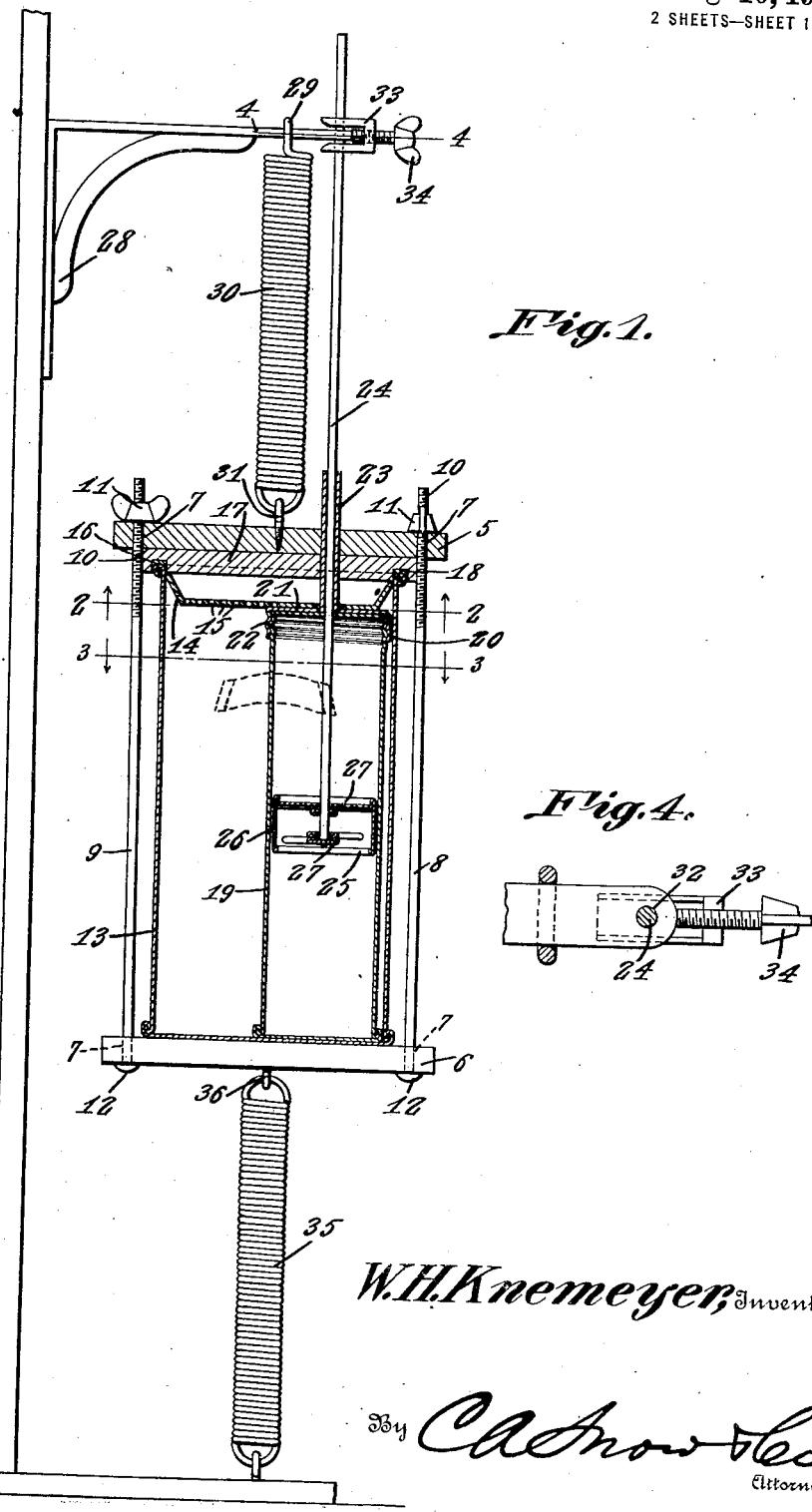

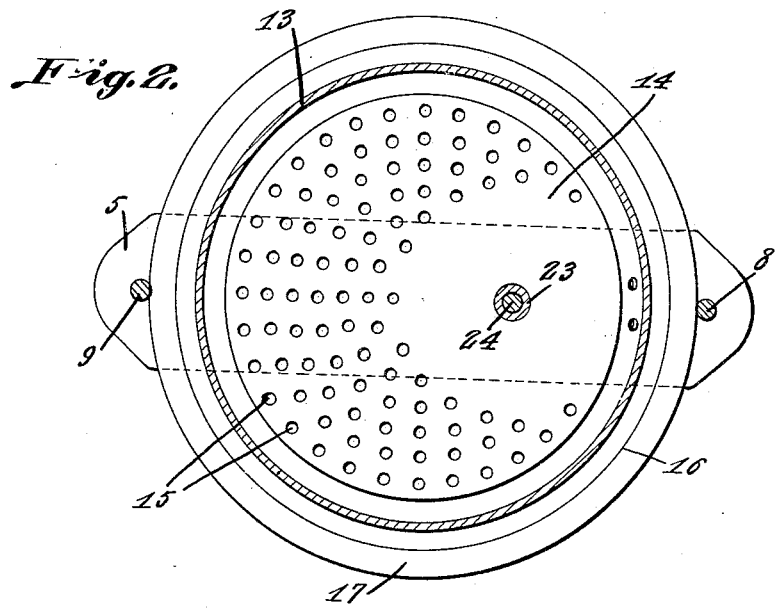
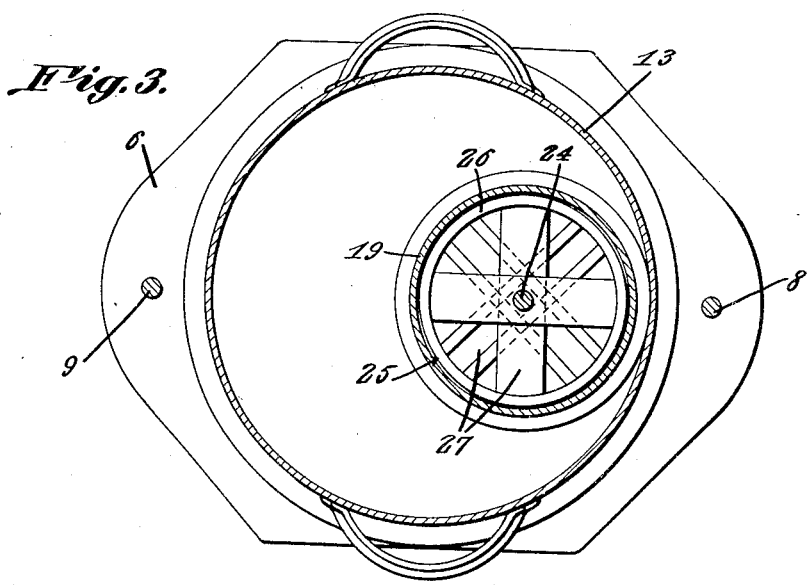

WILLIAM H. KNEMEYER, OF SAN ANTONIO, TEXAS.

ICE-CREAM FREEZER.

1,348,951.   Specification of Letters Patent.   Patented Aug. 10, 1920.

Application filed November 14, 1919. Serial No. 337,971.

*To all whom it may concern:*

Be it known that I, WILLIAM H. KNEMEYER, a citizen of the United States, residing at San Antonio, in the county of Bexar and State of Texas, have invented a new and useful Ice-Cream Freezer, of which the following is a specification.

This invention relates to ice cream freezers, and it is the primary object of the invention to provide novel means for causing the actuation of the dasher within the body of the receptacle employed in connection therewith.

A further object of the invention is to provide means to permit the dasher to be actuated with a minimum amount of exertion on the part of the operator.

A further object of the invention is to provide an adjustable dasher and means for securing such dasher in positions of adjustment to limit the stroke of the dasher within the receptacle associated therewith.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

Referring to the drawing:—

Figure 1 illustrates a longitudinal sectional view through an ice cream freezer constructed in accordance with the present invention.

Fig. 2 illustrates a transverse sectional view taken on line 2—2 of Fig. 1,

Fig. 3 illustrates a transverse sectional view taken on line 3—3 of Fig. 1, and

Fig. 4 illustrates a fragmental detailed view of the means for securing the dasher.

Referring to the drawing in detail, the device is shown as including a frame, which frame comprises an upper member 5, and a lower member 6, the members 5 and 6 being provided with opposed openings 7, formed therein to accommodate the vertical spacing rods 8 and 9, which have their upper ends threaded as at 10 to receive the winged nuts 11, the lower ends of the rods 8 and 9 being provided with the heads 12, to prevent the rods from being moved through the lower member 6, when the upper member 5 has been properly positioned to support the can, forming a part of the invention.

The freezer includes the ice can 13, which is preferably circular in cross section, the upper extremity thereof being closed by the pan 14, provided with the openings 15, the same being provided for the purpose of supporting salt within the upper portion of the ice can to cause the rapid melting of the ice contained in the can 13.

The upper extremity of the can 13, is shown as disposed within the annular groove 16, formed in the under surface of the circular head 17, suitable packing 18 being positioned within the groove to contact with the upper edge of the can 13 to provide a water tight connection between the head 17, and can 13.

Supported within the can 13, at one side thereof is a cream can 19, which has its upper end threaded as at 20 to receive the removable head 21, provided with the depending threaded flange 22, and as shown, the head 21 is apertured and has connection with the upwardly extending tubular element 23, which is of a length to extend above the upper member 5, to provide a bearing for the dasher rod 24, which operates therethrough, the tubular member being shown as extending through suitable openings in the head and salt pan.

Disposed on one end of the rod 24, is the dasher 25, which dasher comprises the circular body portion 26 and the opposed paddles 27, supported within the body 26, so that movement of the rod 24 causes a relative movement of the dasher 25, within the can 19.

A bracket member 28, is secured to any suitable support, in proper spaced relation with the floor surface and provides means for securing the upper end 29 of the coiled spring 30, the opposite end of said coiled spring 30 being connected to the upper end 5 through the medium of the eye bolt 31. As shown, the upper end of the rod 24 passes through the opening 32, formed in the bracket member 28. The securing device 33, embracing the extreme outer end of the bracket 28, receives the upper end of the rod 24, and the thumb screw, 34, operating through a threaded opening formed in the securing device 33, contacts with the extreme outer end of the bracket 28 to set up a binding action between the rod and bracket, so that the rod is secured against movement with relation thereto.

The lower member 6 has connection with the coiled spring 35 through the eye bolt 36, which coiled spring 35 has its lower extremity secured to the floor, so that the lower end of the coiled spring 35 is secured against movement with relation to the floor.

In the operation of the device, the cream can 19 is filled with the cream to be frozen, the dasher is then positioned within the can 19, and ice packed within the can 13, and around the can 19.

The remaining elements of the freezer are now assembled and secured by means of winged nuts 11, and the rod 24 is adjusted within the bracket 28, so that the same will have the desired stroke.

It will thus be seen that by slight pressure on the can, or frame supporting the same, the coiled springs 30 and 35 are contracted and expanded and cause a movement of the can 19 with relation to the stationary dasher 25 which movement causes the agitation of the material in the cream can to be efficiently frozen.

While I have shown and described the device as used in connection with an ice cream freezer it is to be noted that the construction embodied in the above specification may be efficiently employed in connection with churns, egg beaters or the like.

Having thus described the invention, what is claimed is:—

1. In a device of the class described, a frame including an upper section and a lower section, an ice can supported between the sections, a circular head having an annular groove formed therein, contacting with the under surface of the upper section, said ice can having its upper extremity positioned in the annular groove, means for securing the sections together, a salt pan forming the closure for the ice can, a cream can positioned in the ice can and having its upper end in close engagement with the lower surface of the salt pan, for securing the cream can against displacement, a dasher in the cream can, and means for causing the dasher to move within the cream can.

2. In a device of the class described, a frame including an upper section and a lower section, an ice can supported between the sections, a cream can supported within the ice can, the cream can being of a length shorter than the length of the ice can, a salt pan having perforations formed therein, and positioned within the top of the ice can, said salt pan engaging the upper edge of the cream can for securing the cream can within the ice can, a dasher in the cream can, and means for causing the dasher to move within the cream can.

In testimony that I claim the foregoing as my own, I have hereto affixed my signature in the presence of two witnesses.

WILLIAM H. KNEMEYER.

Witnesses:
H. M. RAMSAY,
FRED J. NAGEL.